(12) United States Patent  (10) Patent No.: US 8,104,069 B2
Thurm et al.  (45) Date of Patent: Jan. 24, 2012

(54) ESTABLISHMENT OF SECURITY FEDERATIONS

(75) Inventors: Bernhard Thurm, Karlsruhe (DE); Ji Hu, Karlsruhe (DE)

(73) Assignee: SAP AG, Walldorf (DE)

( * ) Notice: Subject to any disclaimer, the term of this patent is extended or adjusted under 35 U.S.C. 154(b) by 967 days.

(21) Appl. No.: 12/051,557

(22) Filed: Mar. 19, 2008

(65) Prior Publication Data

US 2009/0241166 A1   Sep. 24, 2009

(51) Int. Cl.
 *H04L 29/06* (2006.01)
(52) U.S. Cl. ................................. 726/1; 726/6
(58) Field of Classification Search .................. 726/1, 5, 726/6, 7, 9
See application file for complete search history.

(56) References Cited

U.S. PATENT DOCUMENTS

| 2006/0161272 | A1* | 7/2006 | Haller et al. | 700/29 |
| 2008/0002696 | A1* | 1/2008 | Claessens et al. | 370/392 |
| 2008/0010665 | A1* | 1/2008 | Hinton et al. | 726/1 |

FOREIGN PATENT DOCUMENTS

EP  1 826 979  8/2007

OTHER PUBLICATIONS

'Lightweight Directory Access Protocol (LDAP), request for comments: 4511 network Working Group' [online]. Sermersheim, 2006, [retrieved on Apr. 5, 2008]. Retrieved from the Internet: <URL: http://www.ietf.org/rfc/rfc4511.txt>, 64 pages.

'Web Services Federation Language (WS-Federation), Version 1' [online] Msdn, 2001-2003, [retrieved on Apr. 5, 2008]. Retrieved from the Internet: <URL: http://msdn2.microsoft.com/en-us/library/ms951236.aspx>, 36 pages.

'Web Services Federation Language (WS-Federation), Version 1.1' [online]. Msdn, 2006, [retrieved on Apr. 5, 2008]. Retrieved from the Internet: <URL: http://specs.xmlsoap.org/ws/2006/12/federation/ws-federation.pd>, 124 pages.

'WS-Trust 1.3: Oasis Standard' [online]. Oasis, 2007, [retrieved on Apr. 5, 2008]. Retrieved from the Internet: <URL: http://docs.oasis-open.org/ws-sx/ws-trust/200512/ws-trust-1.3-os.html>, 73 pages.

'Web Services Security v1.1' [online]. Oasis, 2006, [retrieved on Apr. 5, 2008]. Retrieved from the Internet: <URL: http://www.oasis-open.org/specs/index.php#wssv1.0>, 14 pages.

'Security Assertion Markup Language (SAML) v1.1' [online]. Oasis, 2003, [retrieved on Apr. 5, 2008]. Retrieved from the Internet: <URL: http://www.oasis-open.org/specs/index.php#wssv1.0>, 14 pages.

'Windows Server 2003 Active Directory' [online]. Microsoft, 2003, [retrieved on Apr. 5, 2008]. Retrieved from the Internet: <URL: http://www.microsoft.com/windowsserver2003/technologies/directory/activedirectory/default.mspx>, 11 pages.

(Continued)

*Primary Examiner* — Edward Zee
(74) *Attorney, Agent, or Firm* — Fish & Richardson P.C.

(57) ABSTRACT

Secure interactions between administrative domains are modeled. The modeled process specifies role information for each of the administrative domains and interaction between the administrative domains. Role information associated with candidate administrative domains is received, and appropriate administrative domains from the candidate administrative domains are dynamically resolved based on the modeled process and the received role information. Trust realms between the dynamically resolved appropriate administrative domains are automatically derived based on the role information and the interactions from the modeled process. The secure interaction between the dynamically resolved appropriate administrative domains is effected through the automatically derived trust realms.

20 Claims, 13 Drawing Sheets

OTHER PUBLICATIONS

'Soap Version 1.2 Part 1: Messaging Framework (Second Edition)' [online]. W3C, 2007, [retrieved on Apr. 5, 2008]. Retrieved on the Internet: <URL: http://www.w3.org/TR/soapl2-part1/>, 55 pages.

'TrustCoM' [online]. TrustCoM, [retrieved on Apr. 5, 2008]. Retrieved from the Internet: <URL: http://www.eu-trustcom.com/>, 3 pages.

'The Kerberos Network Authentication Service (V5)' [online] Neuman et al., 2005, [retrieved on Apr. 5, 2008]. Retrieved from the Internet: <URL: http://tools.ietf.org/html/rfc4120>, 12 pages.

'ITU-T Recommendation X.509: Information technology—Open systems interconnection—The Directory: Authentication framework' [online] ITU-T, 1997, [retrieved on Apr. 5, 2008]. Retrieved from the Internet: <URL: http://www.itu.int/rec/T-REC-X.509-199708-S/e>, 81 pages.

'Understanding WS-Federation' [online]. Msdn, 2007, [retrieved on Apr. 5, 2008]. Retrieved from the Internet: <URL: http://msdn2.microsoft.com/en-us/library/bb498017.aspx>, 37 pages.

'Web Services Choreography Description Language Version 1.0' [online]. W3C, 2005, [retrieved on Apr. 5, 2008]. Retrieved from the Internet: <URL: http://www.w3.org/TR/ws-cd1-10/>, 88 pages.

'UDDI Version 3.0.2: UDDI Spec Technical Committee Draft' [online] Oasis, 2002-2004, [retrieved on Apr. 5, 2008]. Retrieved from the Internet: <URL: http://uddi.org/pubs/uddi_v3.htm>, 396 pages.

'About Theseus' [online]. BMWi, 2008, [retrieved on Apr. 5, 2008]. Retrieved from the Internet: <URL: http://theseus-programm.de/switchuilocale/en?destination=about-theseus>, 2 pages.

Thurm and Hu, "Automated mapping of business requirements to security federations," *SAP Research Center*, Karlsruhe, Germany, 2007, 10 pages.

Wu et al., "Using Web Services to Exchange Security Tokens for Federated Trust Management," *IEEE International conference on Web Services*, 2007, pp. 1176-1178.

* cited by examiner

ESTABLISHMENT OF SECURITY FEDERATIONS

TECHNICAL FIELD

This description relates to modeling security federations.

BACKGROUND

During the execution of a collaborative process, entities must necessarily interact with each other. Typically, such interaction is modeled during the design of the process and before the need for the collaboration arises, so that specified entities may effectively interact with each other in a predefined manner and preset sequence.

SUMMARY

In one general aspect, trust realms are automatically derived from a model of interactions between enterprises having particular roles and relationships with other enterprises. At the time a need for a collaboration arises, appropriate enterprises for performing an objective of the collaboration are dynamically selected from candidate enterprises. Trust realms between the appropriate enterprises are automatically derived at a time when the need for collaboration arises based on the model, and secure interactions between the appropriate enterprises during the collaboration are effected through the trust realms.

In another general aspect, a process that involves secure interactions between administrative domains is modeled. The modeled process specifies role information for each of the administrative domains and interaction between the administrative domains. Role information associated with candidate administrative domains is received, and appropriate administrative domains from the candidate administrative domains are dynamically resolved based on the modeled process and the received role information. Trust realms between the dynamically resolved appropriate administrative domains are automatically derived based on the role information and the interactions from the modeled process. The secure interaction between the dynamically resolved appropriate administrative domains is effected through the automatically derived trust realms.

Implementations may include one or more of the following features. The process may be modeled using Web Services Choreography Description Language (CDL). The secure interaction may include an issuance of security tokens at each of the administrative domains and a format conversion of the security tokens. Modeling the process may include defining an order, a message format, and parameters of the secure communication. A determination may be made that a collaboration between any two of the dynamically resolved administrative domains has ended, and the trust realm between the two dynamically resolved administrative domains may be terminated based on the determination that the collaboration has ended.

Dynamically resolving the appropriate administrative domains may include generating a list of administrative domains that satisfy the role information specified in the modeled process, and selecting the appropriate administrative domains from the list of administrative domains. An invitation may be transmitted to each of the administrative domains on the generated list of administrative domains, where the appropriate administrative domains may be selected based on receiving an acceptance to the invitation. Effecting the secure interaction the dynamically resolved administrative domains may include accessing trust information associated with the appropriate administrative domains, signalling, to the appropriate administrative domains, the initiation of a collaboration represented by the modelled process, and sending the trust information to the appropriate administrative domains such that the secure interactions among the dynamically resolved administrative domains is effected.

Effecting the secure interaction among the dynamically resolved administrative domains may include signaling, to the appropriate administrative domains, the initiation of a collaboration represented by the modeled process, and allowing access to trust information associated with the appropriate administrative domains such that the trust information is downloadable by the other appropriate administrative domains. Allowing access to trust information may include interaction among the appropriate administrative domains such that the appropriate administrative domains exchange the trust information. The trust information may include keys.

The role information specified in the modeled process may enumerate an observable behavior a first administrative domain exhibits in order to collaborate with a second administrative domain. The role information specified in the modeled process may designate the first administrative domain as a buyer role and the second administrative domain as a seller role. The role information specified in the modeled process may identify a behavior that the first and second administrative domains must satisfy. The behavior may include a purchasing behavior or a customer management behavior for each of the first and second administrative domains. The process may be invoked using the dynamically resolved administrating domains. The process may be composite services process between hierarchically organized administrative domains. The process may be a collaborative engineering process, and the secure interactions between administrative domains may be peer-to-peer interactions.

In another general aspect, a computer program product tangibly embodied in a machine-readable medium includes instructions that, when read by a machine, operate to cause a data processing apparatus to model a process that involves secure interaction between administrative domains, the modeled process specifying role information for each of the administrative domains and interaction between the administrative domains, receive the role information associated with candidate administrative domains, dynamically resolve appropriate administrative domains from the candidate administrative domains based on the modeled process and the received role information, automatically derive trust realms between the dynamically resolved appropriate administrative domains based on the role information and the interactions from the modeled process, and effect secure interactions among the dynamically resolved appropriate administrative domains through the automatically derived trust realms.

In another general aspect, a device includes a processor configured to model a process that involves secure interaction between administrative domains, the modeled process specifying role information for each of the administrative domains and interaction between the administrative domains, receive the role information associated with candidate administrative domains, dynamically resolve appropriate administrative domains from the candidate administrative domains based on the modeled process and the received role information, automatically derive trust realms between the dynamically resolved appropriate administrative domains based on the role information and the interactions from the modeled process, and effect secure interactions among the dynamically resolved appropriate administrative domains through the automatically derived trust realms. The device also includes a repository configured to store the role information associated with each of the administrative domains and relationship types associated with each of the administrative domain, and transmit the role information and relationship type to the processor.

Implementations of any of the techniques described above may include a method or process, a system, or instructions stored on a machine-readable storage device. The details of particular implementations are set forth in the accompanying drawings and description below. Other features will be apparent from the following description, including the drawings, and the claims.

DETAILED DESCRIPTION

Figure 1:
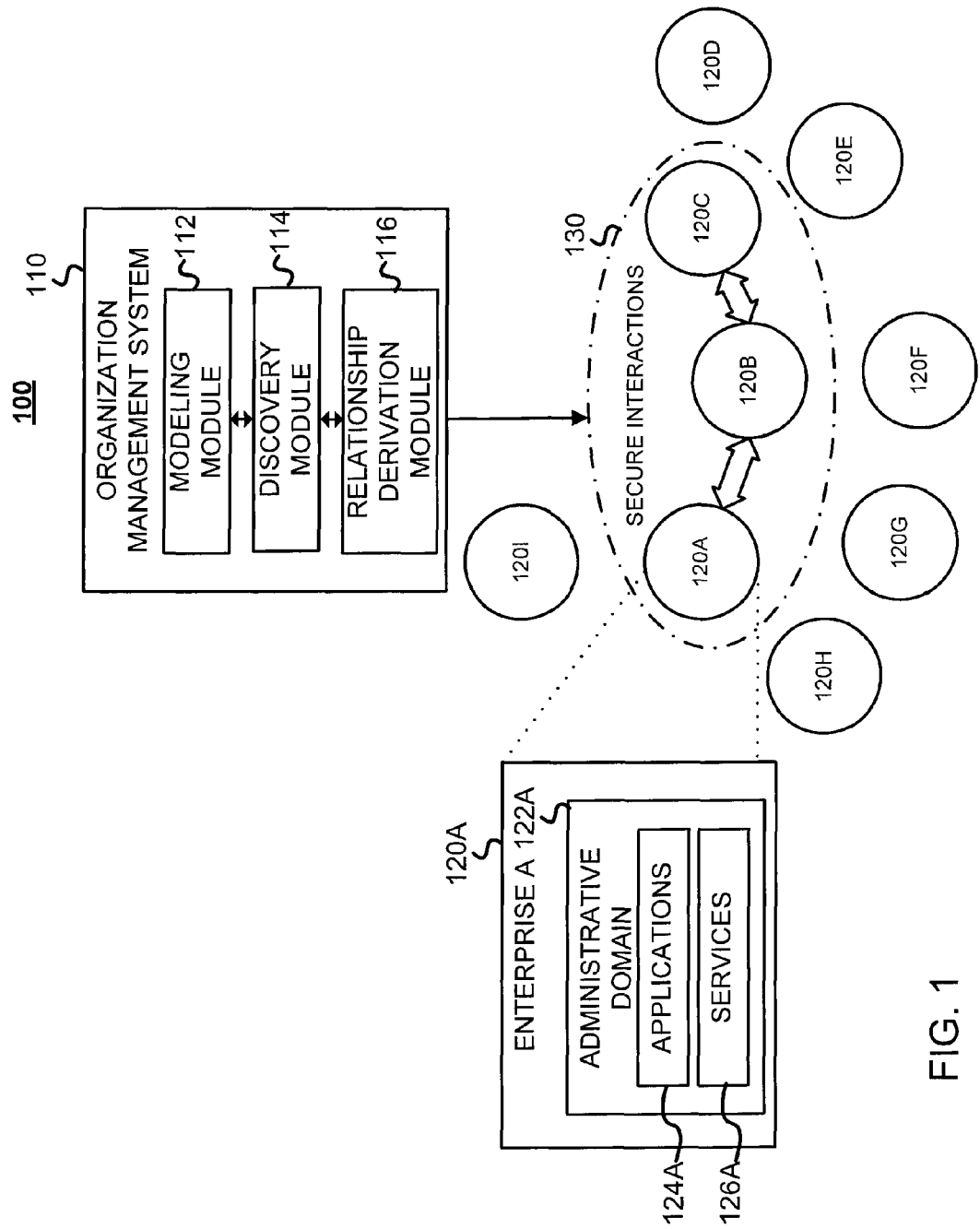
FIGS. 1, 2, 6, and 7A-7C are block diagrams illustrating example systems for effecting secured interactions.

Referring to FIG. 1, a system 100 includes an organization management system 110 that effects secure interactions between enterprises 120A, 120B, and 120C such that the enterprises 120A, 120B, and 120C may collaborate and share resources securely through a trust realm 130 to pursue a cross-organizational opportunity (such as a common business opportunity). In particular, at the time the need for the collaboration arises, the trust realm 130 (which also may be referred to as a security federation) is automatically established such that each enterprise in the collaboration may securely share resources with the other enterprises in the trust realm for the duration of the collaboration. A collaboration may be one or more enterprises interacting to pursue a business opportunity or some other cross-organizational opportunity. A collaboration may be a process, such as, for example, a business process that specifies interactions among parts of an enterprise and/or among enterprises. A collaboration also may be an interaction between enterprises to achieve an objective that the enterprises would have difficulty achieving individually. A collaboration may be among different portions of a single enterprise and/or multiple enterprises.

As described in more detail below, the organization management system 110 automatically and dynamically identifies the enterprises 120A, 120B, and 120C to pursue the cross-organizational opportunity from among candidate enterprises 120A-120I. The candidate management system 110 is trusted by the candidate enterprises 120A-120I. Because the enterprises 120A, 120B, and 120C were dynamically identified, the enterprises 120A, 120B, and 120C may be referred to as appropriate enterprises.

In greater detail, the organization management system 110 automatically determines a federated identity management architecture among administrative domains of appropriate enterprises 120A, 120B, and 120C based on a modeled collaboration at the time that the need for the collaboration arises. Each of the appropriate enterprises 120A, 120B, and 120C maintains its own identity data and provides authentication information based on the identity data to the other appropriate enterprises in the business process. In this manner, the appropriate enterprises 120A, 120B, and 120C may share resources to execute the business process for at least the duration of the collaboration. In some implementations, the appropriate enterprises 120A, 120B, and 120C maintain separate resources after the collaboration has ended. In some implementations, the appropriate enterprises 120A, 120B, and 120C continue to share resources through the trust realm 130 after the collaboration has ended.

The enterprises 120A-120I may be any type of company or organization that interacts with other, external enterprises and/or interacts internally with other parts of the enterprise. For example, one or more of the enterprises 120A-120I may be a web-based business that interacts with other enterprises through an electronic marketplace. Although enterprises 120A-120I are shown in the example of FIG. 1, there may be thousands of additional enterprises that are potential or candidate collaborators, or there may be fewer potential or candidate enterprises than shown in FIG. 1. The opportunities presented by the collaboration may be short-lived (e.g., the collaboration may last for a few minutes or hours as opposed to being a permanent collaboration) or the collaboration may be a long-term collaboration in which the dynamic identification may recur. Additionally, in some implementations, the secure sharing of resources lasts as long as the collaboration persists. Thus, the enterprises may not be required to continue to share resources with the other enterprises after the collaboration ends.

As described in more detail below, each of the enterprises 120A-120I has a role and a relationship type, and the organization management system 110 uses the roles and relationship types to model the collaboration. The model may be defined using, for example, an Extensible Mark-up Language (XML)-based design language such as the Web Services Choreography Description Language (WS-CDL), or any other programming language that allows definition of interactions between cooperating participants. The interactions of an enterprise with other enterprises may be defined by one or more relationship type elements in the design language. An enterprise's role may be the observable behavior that the enterprise exhibits in order to interact or collaborate with other enterprises. For example, an enterprise that purchases goods may have a role of "buyer," and an enterprise that sells goods may have a role of "seller." An enterprise's relationship type may be the capabilities that the enterprise offers in the enterprise's interaction with other enterprises. For example, the capabilities of an enterprise that is an on-line payment system may include effecting electronic fund transfers and tracking payments between a buyer of goods and a seller of the goods. An enterprise may have more than one role and/or relationship type.

The organization management system 110 includes a modeling module 112, a discovery module 114, and a relationship derivation module 116. The modeling module 112 models a cross-organizational process using the roles and relationship types of each enterprise. The discovery module 114 identifies or resolves the appropriate enterprises 120A, 120B, and 120C for executing the collaboration. The relationship derivation module 116 effects a trust realm or federation, such as the trust realm 130, between the appropriate enterprises such that the enterprises may securely share resources.

Each of the enterprises 120 has an administrative domain, such as shown by the example enterprise 120A. The example enterprise 120A has an administrative domain 122A, which includes applications 124A and services 126A. The applications 124A and services 126A may include applications and services configured, adapted, or otherwise operable to provide the capabilities provided by the enterprise. The other enterprises 120B-120I similarly have their own administrative domain, services, and applications. Each enterprise 120A-120I has full access to its own services and applications, and each enterprise 120A-120I manages user data and credentials through, for example, an identity management system such as Lightweight Directory Access Protocol (LDAP) or Active Directory. In the example shown in FIG. 1, the trust realm 130 allows the appropriate enterprises 120A, 120B, and 120C to interact securely to execute a collaboration.

Figure 2:
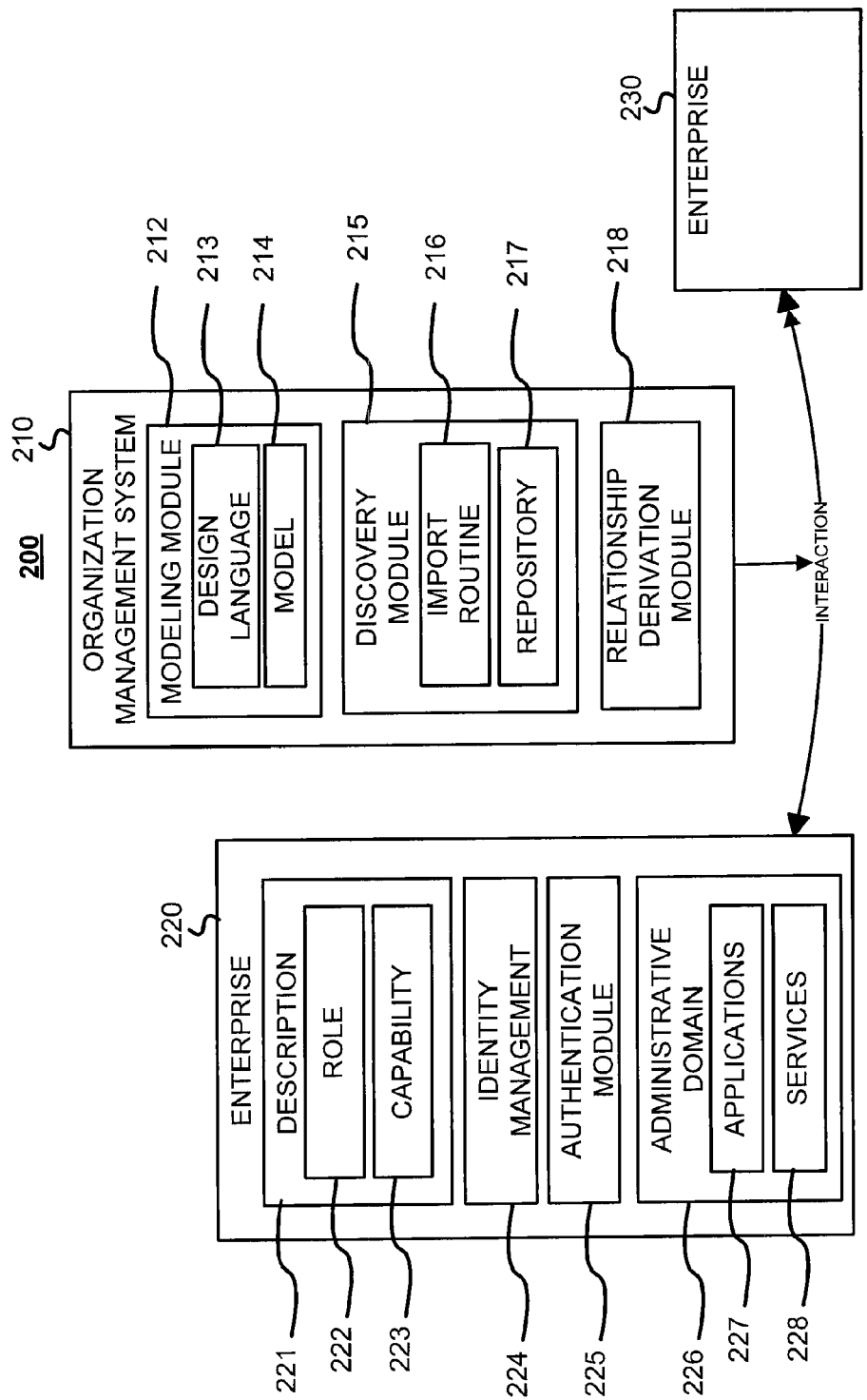

Referring to FIG. 2, a system 200 includes an organization management system 210 that effects an interaction between an enterprise 220 and an enterprise 230. The organization management system 210 may be similar to the organization management system 110 discussed above with respect to FIG. 1. The enterprise 230 may be an appropriate enterprise dynamically resolved by the organizational management system 210.

The organization management system 210 includes a modeling module 212, a discovery module 215, and a relationship derivation module 218. The design language 213 may be, for example, an XML-based language, such as WS-CDL. In some implementations, the design language 213 may be any other XML-based language or another programming language. The modeling module 212 includes a design language 213 used to model a collaboration between multiple enterprises. The modeling module 212 may produce a model 214. The model 214 may be a CDL document, or any other type of information that defines a collaboration, and the model 214 may be referred to as, for example, a choreography specification or a design document.

The model 214 represents the interactions between generic enterprises based on the roles and capabilities of the generic enterprises rather than the specific identities, roles, relationships, or capabilities of particular enterprises. For example, the modeling module 212 may determine a model of a collaboration for selling rare books on-line that includes an enterprise that purchases books to sell on-line and processes orders for books from on-line users, an enterprise that manages inventory for other enterprises, and an enterprise that stocks and sells rare books. The model 214 of the collaboration formally defines the roles fulfilled by the generic enterprises included in the model and the interactions between the enterprises. The model also may include defining an order, a message format, and parameters of a secure communication between the enterprises. In some implementations, the model 214 may come from a source external to the organization management system 210. For example, the model 214 of the collaboration may be provided by an enterprise.

The discovery module 215 includes an import routine 216 and a repository 217. The import routine 216 imports the model 214. As discussed above, the model 214 of the collaboration may be expressed in an XML-based language. The model 214 may be included in, for example, a file that is imported into the discovery module through the import routine 216. The import routine 216 may extract the role information from the model 214.

The repository 217 stores data that identifies the enterprises available to participate in a collaboration. Such enterprises may be referred to as candidate enterprises, and the candidate enterprises may each be associated with one or more candidate administrative domains. The data includes information that identifies the enterprises and the roles and capabilities of the enterprises. In particular, the repository 217 is used to publish the capabilities and roles for each enterprise. The discovery module 215 matches the role information extracted from the model of the collaboration with the published roles in the repository 217 to determine the appropriate enterprises to execute the collaboration. The repository 217 also stores an address, or other information that specifies a location of the enterprise on a network at which the enterprise receives and transmits data, of each enterprise.

In some implementations, Universal Description Discovery Integration (UDDI) providing yellow/while pages directory services may be used to publish the capabilities and roles of the enterprises. In these implementations, the UDDI can be accessed through the Internet and the enterprises only publish information about the enterprise in one repository. Each enterprise may have an entry in the repository 217 and each enterprise may be identified by a universally unique identifier (UUID). In these implementations, each entry includes a key value that identifies the enterprise, a discovery Uniform Resource Locator (URL), a name associated with the enterprise, a description of the enterprise, contacts associated with the enterprise and the services that the enterprise provides (e.g., the roles and/or capabilities of the enterprise). An example of an entry in the repository 217 is discussed in more detail below with respect to FIG. 6.

In the example shown in FIG. 2, the repository 217 is implemented with the discovery module 215; however, this is not necessarily the implementation used in other examples. In some examples, the repository 217 may be separate from the discovery module 215 but may still be in communication with the discovery module 215. For example, the repository 217 may be implemented with the organization management system 210 as a module separate from the discovery module 215. In other implementations, such as the examples shown in FIGS. 4B, 6, and 7A-7C, the repository 217 may be implemented separately from the organization management system 210. For example, the repository 217 may be implemented, stored, invoked and/or maintained on a centralized server separate from, and in communication with, the organization management system 210. The repository 217 may be, for example, a relational database that logically organizes data into a series of database tables. Each database table arranges data in a series of columns (where each column represents an attribute of the data stored in the database) and rows (where each row represents attribute values). The repository 217 may be, for example, an object-oriented database that logically or physically organizes data into a series of objects. Each object may be associated with a series of attribute values. The repository 217 also may be a type of database management system that is not necessarily a relational or object-oriented database. For example, a series of XML files or documents may be used, where each XML file or document includes attributes and attribute values. In another example, XML pieces may be stored in the database. The data included in the repository 217 may be received from the enterprises. In some implementations, the enterprises may be invited to provide data to the repository 217. In some implementations, the enterprises provide the data to the repository 217 by registration.

The organization management system 210 also includes the relationship derivation module 218. The relationship derivation module 218 derives trust realms between the appropriate enterprises, for example, when, or shortly after, the need for a collaboration between the appropriate enterprises arises. The establishment of the trust realms allows calls for services provided by the appropriate enterprises to be authenticated for the duration of the collaboration. Thus, the relationship derivation module 218 effects secure interactions between the appropriate enterprises. Example architectures for implementing the trust realms once the trust realms are derived are discussed in more detail with respect to FIGS. 7A-7C.

The enterprise 220 includes a description 221, an identity management module 224, authentication module 225, and an administrative domain 226. The enterprise 230 includes similar features.

The description 221 includes a role 222 (or "role information") and a capability 223. As discussed above, the role 222 describes the interactions the enterprise 220 has, is intended and/or capable of having, with other enterprises (such as "buyer" enterprise and/or "seller" enterprise). The capability 223 describes the relationships that the enterprise 220 has, is intended to have and/or is capable of having, with other enterprises and the services that the enterprise 220 offers to other enterprises. The description 221 may be published to the repository 217 along with other information about the enterprise 220. The enterprise 220 also includes an identity management module 224 and an authentication module 225. The identity management module 224 manages user data and credentials, and the authentication module 225 controls access to the services of the enterprise 220.

The enterprise 220 also includes an administrative domain 226, which may be items under the control of the enterprise 220. The administrative domain 226 includes applications 227 and services 228, which the enterprise 220 shares with other enterprises, or with other parts of the enterprise 220, during and/or after a collaboration. The administrative domain 226 also may include other items under the control of the enterprise such as, for example, network resources, services, applications, security resources (e.g., firewalls) and hardware resources (e.g., computers, portable devices, routers, and printers). The applications 227 and the services 228 are related to the roles 222 and capabilities 223 of the enterprise 220. For example, the enterprise 220 may be an on-line payment system. In this example, the on-line payment system may have a function or application for effecting a fund transfer between a buyer and a seller.

Figure 3:
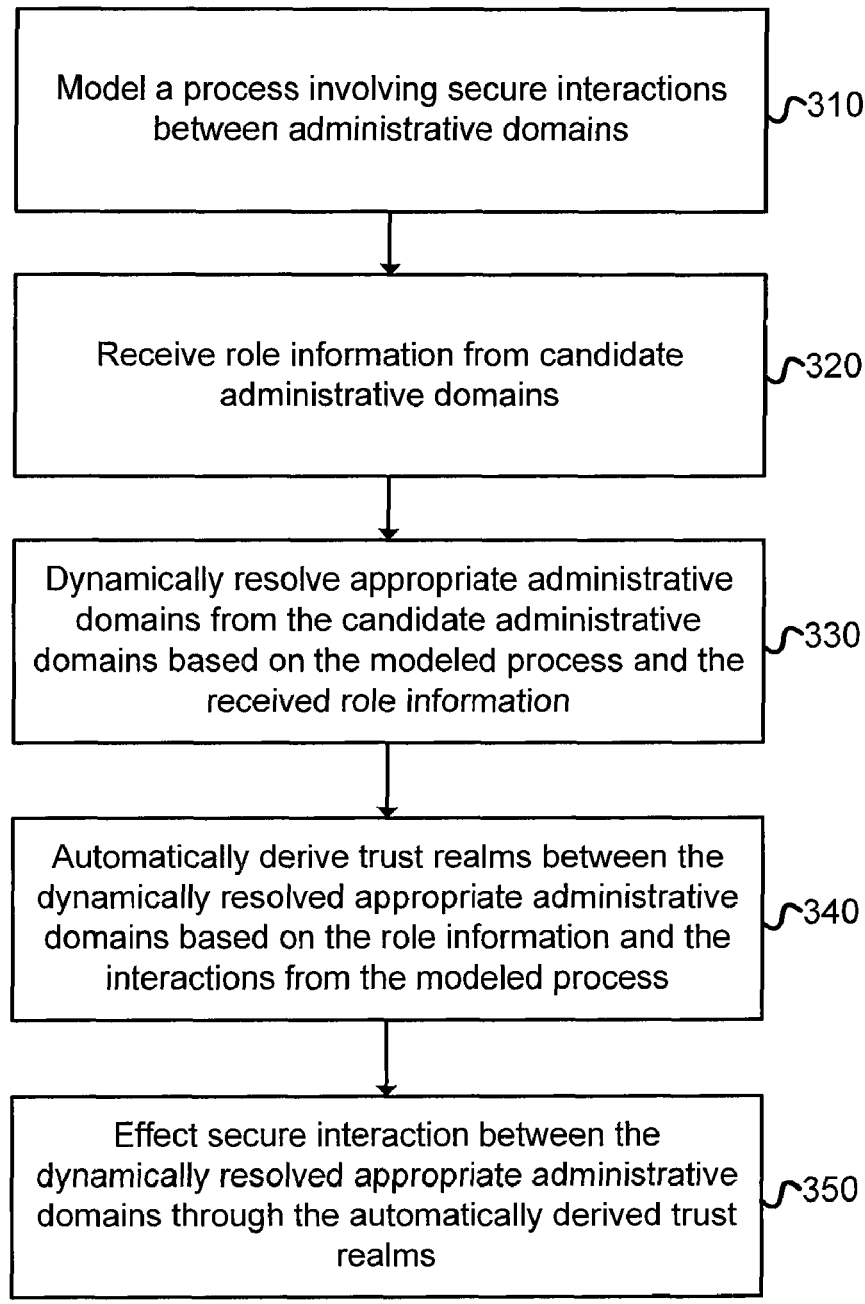
FIG. 3 shows an example process for effecting secured interactions.

Referring to FIG. 3, an example process 300 may be used to effect a secure interaction between appropriate administrative domains. The example process 300 may be performed by a processor included in an organization management system, such as the organization management 110 or the system 210 discussed above with respect to FIGS. 1 and 2, or by a processor included in any other system.

A generic process involving secured interactions between generic administrative domains is modeled (310). The modeled process specifies role information for each of the administrative domains and specifies interactions between the administrative domains. The process is modeled before, concurrently, or shortly after, the need for the process arises. Role information is received from candidate administrative domains (320). Appropriate administrative domains are dynamically resolved from the candidate administrative domains based on the modeled process and the received role information (330). Trust realms among the dynamically resolved appropriate administrative domains are automatically derived based on the role information and the interactions from the modeled process (340). Secured interaction between the dynamically resolved appropriate administrative domains is effected through the automatically derived trust realms (350).

In one general implementation, the secured interactions may be effected separately from the automatic derivation of trust realms, such as by effecting the secure interactions before or after an operation to automatically derive trust realms begins or ends, or by invoking two separate functions to perform each operation. In these cases, the derivation of the trust realms may be seen as a distinct from effecting the secured interactions.

In other implementations, the derivation of the trust realms occurs as part of a process or operation which effects the secure interactions. For instance, a parent function may be invoked to effect a secure interaction which, as part of this parent function, calls a child function to automatically derive the trust realm prior to the completion of the parent function. In these implementations, the trust realms may be derived concurrently with or after the secured interactions between the dynamically resolved appropriate administrative domains begin to be effected. Put another way, effecting a secure interaction between the dynamically resolved appropriate administrative domains through the automatically derived trust realm may further include automatically deriving trust realms between the dynamically resolved appropriate administrative domains based on the role information and the interactions form the modeled process.

Figure 4:
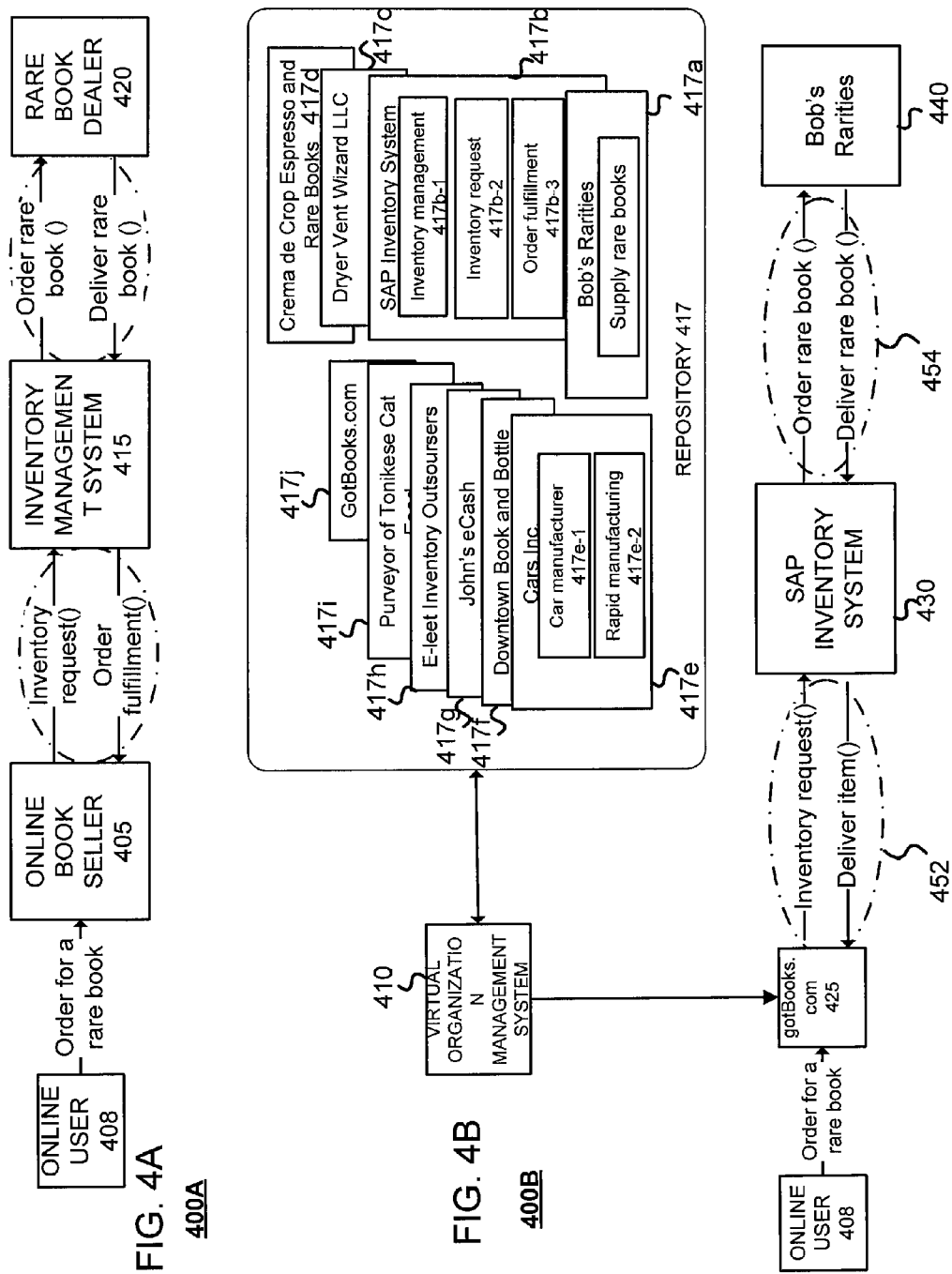
FIGS. 4A and 4B show an illustration of a collaboration including secured interactions.

Referring also to FIG. 4A, an example generic process 400A is modeled. In this example, a process that specifies a collaboration among administrative domains of various enterprises is shown. In particular, a collaboration to sell rare books through an on-line book retailer is shown. In the example generic process 400A, an on-line book retailer 405 receives an order for a rare book from an online user 408. In this example, the on-line book retailer 405 outsources inventory management functions to a third-party inventory management system 415. Additionally, although the online book retailer 405 offers rare books for sale, the on-line book retailer 405 obtains the rare books from individual rare book dealers, such as the rare book dealer 420, on an as-needed basis. Thus, a collaboration between the on-line book retailer 405, the inventory management system 415, and the rare book dealer 420 arises when the on-line book retailer 405 receives an order for a rare book.

In order to fulfill the order for the rare book, the on-line book retailer 405 makes a service call (e.g., by invoking a "INVENTORY_REQUEST( )" function call) to a service offered by the inventory management system 415 to determine whether the inventory management system 415 has access to the requested book. The inventory management system 415 determines that the rare book is available and makes a call ("ORDER_RARE_BOOK( )") to the rare book dealer 420. The rare book dealer 420 delivers the rare book to the inventory management system 425 ("DELIVER_RARE_BOOK( )"). The inventory management makes a call to the on-line book retailer 405 ("ORDER_FULFILLMENT( )") indicating that the order for the rare book has been satisfied.

The interaction between the on-line book seller 405, the inventory management system 415, and the rare book dealer 420 may be modeled using CDL. In particular, the CDL model defines the role of each enterprise in the generic process and the relationships between the enterprises. In the example discussed above, the model defines interactions among a generic on-line book retailer, a generic inventory system, and a rare book dealer.

Referring to FIG. 4B, information associated with various enterprises is stored in and accessed from the repository 417. For example, each of the enterprises may be associated with an administrative domain included in the administrative domains 417a-417j, and these administrative domains 417a-417j may be referred to as candidate administrative domains. In the example shown in FIG. 4B, the repository 417 is implemented separately from an organization management system 410. However, as discussed above with respect to FIG. 2, the repository 417 includes data associated with each of the enterprises having the administrative domains 417a-417j. Although administrative domains 417a-417j are shown in the example of FIG. 4B, in other examples, data associated with the administrative domains of many thousands of enterprises may be stored in the repository 417. The organization management system 410 may be similar to the organization management system 110, discussed above with respect to FIG. 1 or the organization management system 210 discussed above with respect to FIG. 2.

The repository 417 includes an indication of the services and roles associated with each of the candidate administrative domains. For example, the administrative domain 417e associated with an enterprise "Cars Inc.," includes the role "car manufacturer" 417e-1 and the service "rapid manufacturing" 417e-2. In another example, the administrative domain 417b associated with an "SAP Inventory System," 430 includes the role "inventory management" 417b-1 and the services "inventory request" 417b-2 and "order fulfillment" 417b-3. In some implementations, the administrative domains may include additional services and roles.

Appropriate administrative domains are dynamically resolved by the organization management system 410 from the candidate administrative domains based on the modeled process and the received role information. The appropriate administrative domains are resolved concurrently, or shortly after, the need for the collaboration arises. Continuing the above example, the appropriate administrative domains are resolved when an on-line book retailer "gotBooks.com" 425 receives an order for a rare book. In this example, on-demand role selection is supported. To resolve the appropriate administrative domains, in some implementations, the role information is extracted from the repository 417 and compared to the roles requested for the process indicated in the model of the collaboration (such as the CDL model discussed above). In the example shown in FIG. 4B, the appropriate administrative domains are determined to be administrative domains 417b and 417a, which are respectively associated with the enterprise "SAP Inventory System" 430 and "Bob's Rarities" 440. Other available administration domains are not resolved, perhaps because the other administrative domains do not offer services and/or applications of interest for the collaboration. For example, the administrative domain 417e that is associated with "Cars Inc.," which has a role of "car manufacturer" 417e-1 is not resolved. In other example, the administrative domain 417f, associated with an enterprise "Downtown Book and Bottle" is also not resolved, perhaps because "Downtown Book and Bottle" does not offer rare books. Similarly, the administrative domain 417c associated with an enterprise "Dryer Vent Wizard LLC" is not resolved, perhaps because "Dryer Vent Wizard LLC" has a role related to dryer repair rather than inventory control or retailing rare books.

Figure 9:
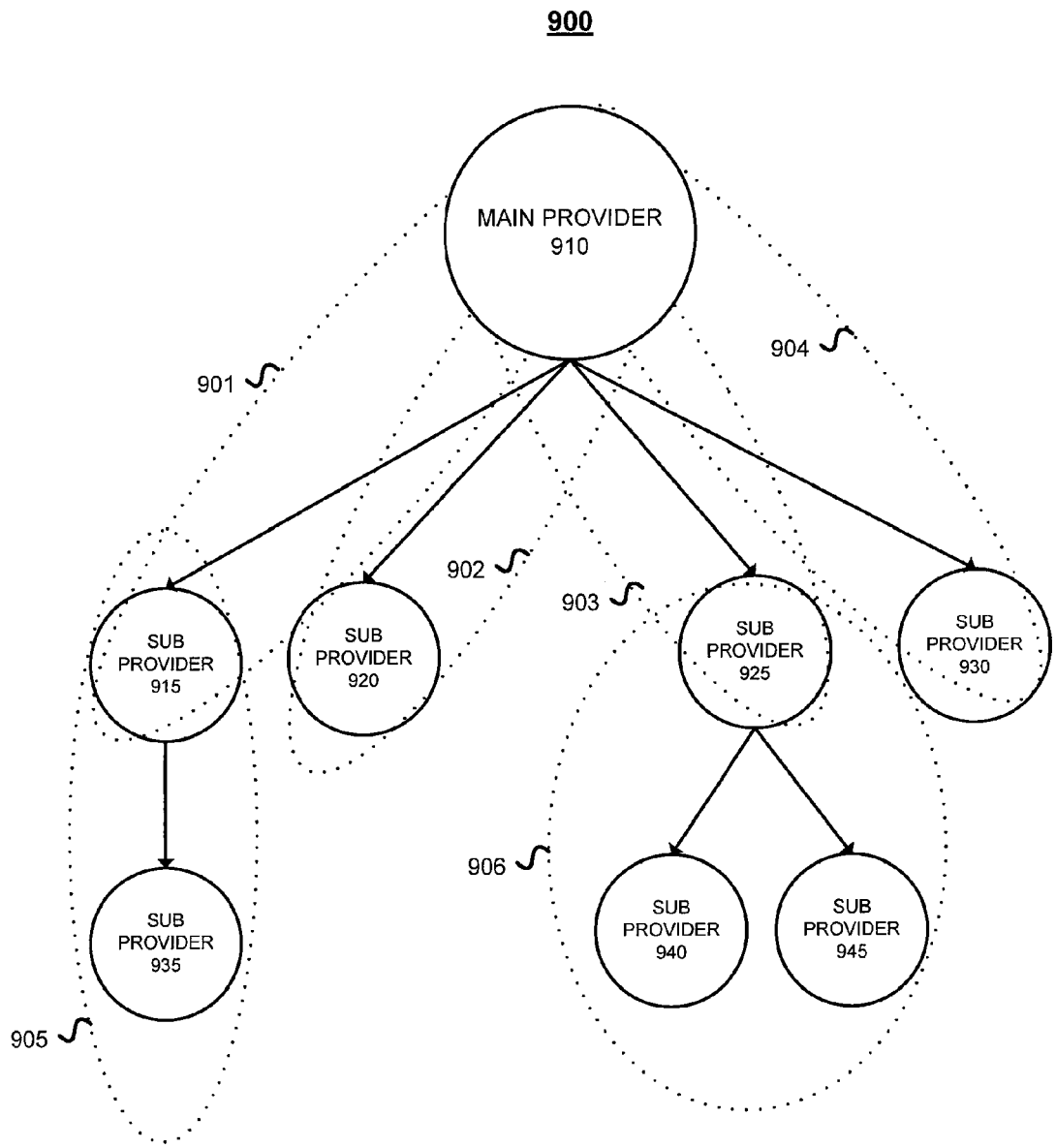

Secure interaction between the appropriate administrative domains is effected. As shown in the example, secure interactions occur between the on-line book retailer "gotBooks.com" 425 and the enterprise "SAP Inventory System" 430 through a trust realm 452. Secure interactions between the enterprise "SAP Inventory System" 430 and the book seller "Bob's Rarities" 440 occur through a trust realm 454. The trust realms 452 and 454 are created, at runtime and after the selection of the appropriate administrative domains, between administrative domain 417j of "gotBooks.com" 425 and the administrative domain 417b associated with "SAP inventory system" 430 and between the administrative domain 417b of the "SAP inventory system" 430 and the administrative domain 417a of "Bob's Rarities" 420. In this example, the trust realms 452 and 454 allow peer-to-peer secure interactions, but in other examples, trust realms may allow hierarchical relationships. Such an example is shown in FIG. 9. The trust realms 452 and 454 allow calls to the services provided by enterprises that interact through the trust realms 452 and 454 to be authenticated across the boundaries of the enterprises for the duration of the collaboration (in this example, the collaboration persists until the administrative domain 417j associated with "gotBooks.com" 425 receives an indication that the order for the rare book has been fulfilled). Processes for distributing the determined trust realms is discussed in more detail with respect to FIGS. 7A-7C. As discussed with respect to FIGS. 4A and 4B, interactions included in a generic collaboration are modeled, a dynamic discovery to determine the appropriate partner enterprises is performed, and the security federation, or trust realm, to enable the enterprises to collaborate securely are automatically derived. Once the trust realms are automatically derived, secure interactions between the enterprises through the trust realms are effected.

Figure 5:
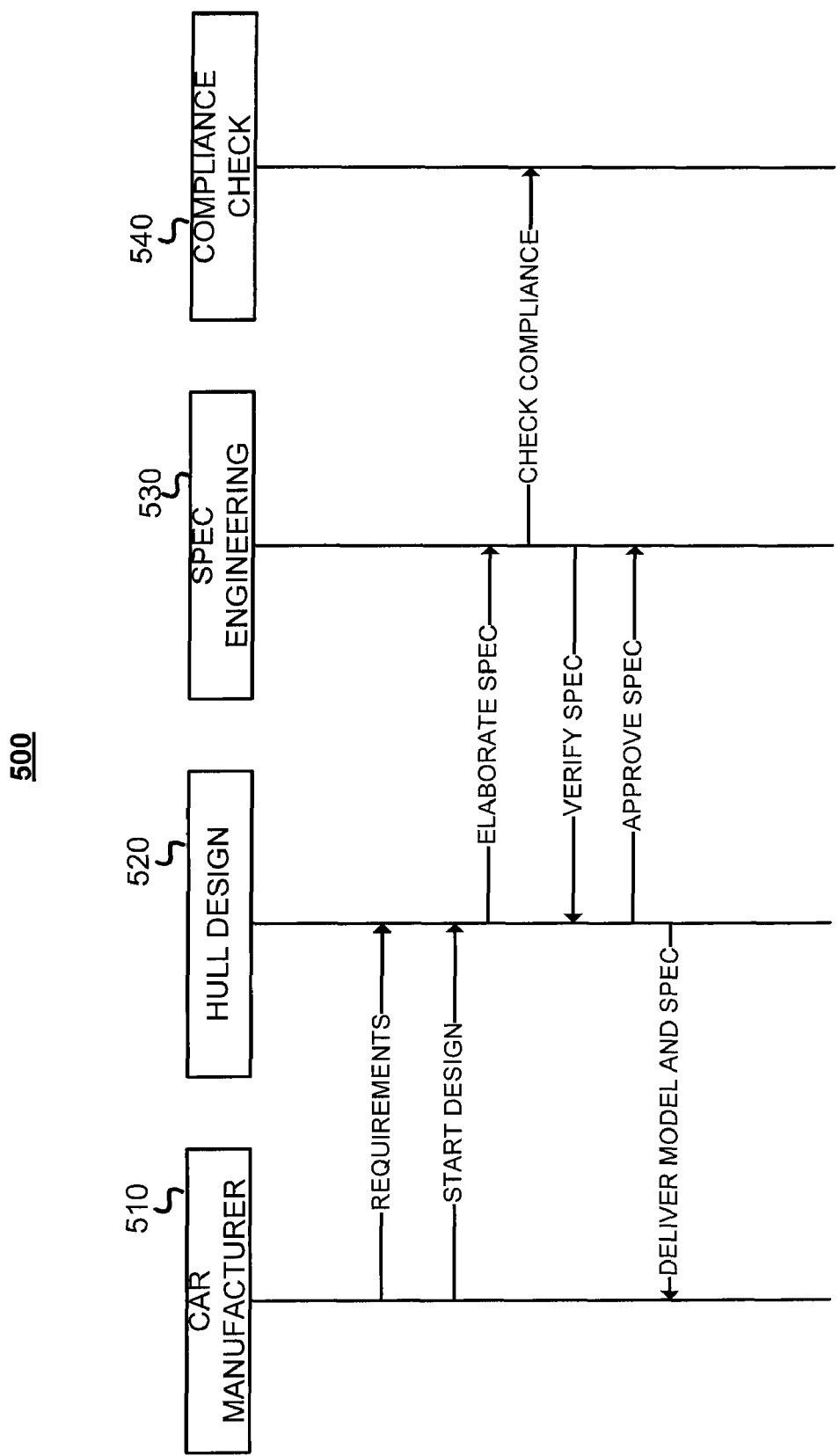
FIG. 5 shows an example choreography of a collaboration including secured interactions.

Referring to FIGS. 5, 6, and 7A-7C, an additional example is discussed in which four enterprises collaborate to design a car. Referring to FIG. 5, an example choreography 500 shows a generic process that specifies a collaboration between a car manufacturer 510, a hull design enterprise 520, a specification engineering enterprise 530, and a compliance check enterprise 540. A generic process may be a process that specifies or defines interactions between entities and roles performed by entities as opposed to a process that defines specific entities to perform the process. The choreography 500 may be formally defined using a design language. Similar to the generic on-line book seller 405 discussed with respect to FIG. 4A, in the example shown in FIG. 5A, the car manufacturer has outsourced tasks related to manufacturing cars to other enterprises. In this example, the car manufacturer has outsourced design tasks related to manufacturing cars to the hull design enterprise 520, the specification engineering enterprise 530, and the compliance check enterprise 540. The hull design enterprise 520 provides capabilities of designing a hull of an automobile, the specification engineering enterprise 530 generates technical specifications for designs provided by the hull design enterprise 520, and the compliance check enterprise 540 determines whether the specifications provided by the hull design enterprise comply with administrative, governmental, and/or industrial standards for safety, ecology, and/or other requirements. Although the interactions shown in the choreography 500 are one-way interactions, in other examples interactions between enterprises may be two-way (e.g., bidirectional) interactions.

Similar to the example discussed above with respect to FIG. 4A, the interactions between the enterprises may be defined in a choreography specification (which also may be referred to as a design document, a CDL document, or a design specification) using a design language, such as CDL. Table 1 shows an example CDL document formally defining the example interactions shown in the choreography 500. The CDL document describes how a generic enterprise is capable of engaging in collaborations with other generic enterprises. The CDL document includes and specifies general roles that occur in a workflow, but the CDL does not include dedicated, specific enterprises. Additionally, the CDL document may include messages exchanged, operations, parameters, and a general workflow structure under a <choreography>element. However, the <choreography> element is not needed to derive trust realms used to for the collaboration.

TABLE 1

Example CDL Document

```
<roleType name="CarManufacturer">
        <behaviour name="carManufactureInterface"/>
</roleType>
<roleType name="HullDesign">
        <behaviour name="hullDesignInterface"/>
</roleType>
<roleType name="SpecEngineering">
        <behavior name="specEngineeringInterface"/>
</roleType>
<roleType name="ComplianceCheck">
        <behavior name="complianceCheckInterface"/>
</roleType>
<relationshipType name="Maker-Designer">
             <roleType typeref ="tns: CarManufacturer" />
             <roleType
               typeref ="tns: HullDesign" />
</relationshipType>
<relationshipType name="Designer-Engineer">
      <roleType
       typeref ="tns: HullDesign" />
      <roleType
       typeref ="tns: SpecEngineering" />
</relationshipType>
<relationshipType name="Engineer-Checker">
      <roleType
       typeref ="tns: SpecEngineering" />
```

TABLE 1-continued

Example CDL Document

```
      <roleType
       typeref ="tns: ComplianceCheck" />
</relationshipType>
```

In the CDL document, role types, participant types, and relationship types may define the interactions between the enterprises. Role types, or roles, describe the observable behavior that an enterprise exhibits with other enterprises. Within the roleType element in a CDL document, the behavior element specifies a subset of the observable behavior an enterprise exhibits. Participant types identify a set of role types that are implemented by the same logical entity or enterprise. Relationship types identify the role types needed for two enterprises to collaborate. Thus, the relationshipType element has two roleTypes defined, and each roleType is specified by the type attribute within the role element. In the example shown in Table 1, the car manufacturer 510 has a roleType name of "Car Manufacturer," and a behavior of "carManufactureInterface."The relationshipType "Maker-Designer" identifies "Car Manufacturer" and "Hull Design" as the roles needed to have a successful collaboration between a maker of cars and a designer of cars.

Figure 6:
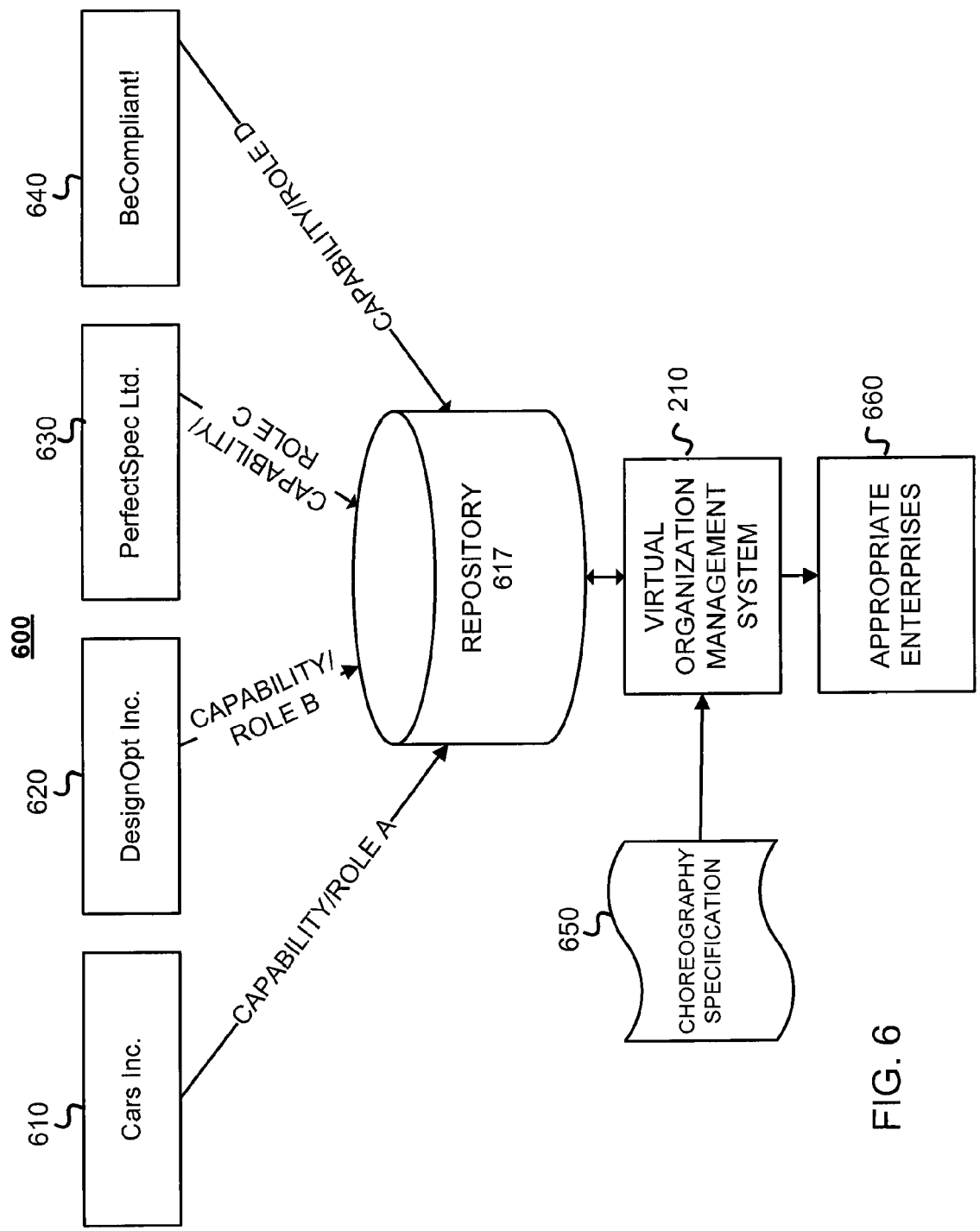

Referring to FIG. 6, an example architecture of a discovery system 600 is shown. The system 600 includes enterprises 610, 620, 630, and 640. The system 600 also includes a repository 617, which may be similar to the repository 217 or the respository 417 discussed above. In the system 600, the enterprises 610, 620, 630, and 640 publish their roles and capabilities in the repository 617. A choreography specification 650 defines the interactions shown in FIG. 5. The choreography specification 650 may be similar to the example shown in Table 1. Appropriate administrative domains associated with one or more enterprises are identified based on the choreography specification 650 and the data stored in the repository 617, which includes an entry for each enterprise. Table 2 shows an example entry in the repository 617 for an enterprise "Cars Inc" 610.

TABLE 2

Example Repository Entry

```
<businessEntity businessKey=" ba633ed0-2aaf-11d5-70dc-001024118c53"
     <name>Cars Inc</name>
     <description xml:lang="en">A car maker of Germany</description>
     <contacts>
            <contact useType="Publisher">
                   <personName> ...</personName>
                   <phone useType="..."/> ... </phone>
                   <email useType="..."> ... </email>
            </contact>
     </contacts>
     <businessServices>
            <businessService serviceKey="63722160-2aa7-11da-a150-b60d465877d3"
                          businessKey="ba633ed0-2aaf-11d5-70dc-001024118c53">
                   <name>car manufacturer</name>
                   <description>Rapid car manufacturing</description>
                   <bindingTemplates>
                          ...
            </businessService>
                   ...
     </businessServices>
</businessEntity>
```

In the example shown in Table 2, the enterprise "Cars Inc." 610 is associated with an administrative domain that includes the business service "car manufacturer" and the service description "rapid car manufacturing." Thus, the administrative domain associated with the enterprise "Cars Inc." 610 maybe identified as an appropriate administrative domain to fulfill the role of car manufacturer 510 in the collaboration to design a car discussed with respect to FIG. 5. The identified appropriate enterprises may be invited to participate in the collaboration. Similarly, the enterprise "DesignOpt Inc." 620, the enterprise "PerfectSpec Ltd." 630, and the enterprise "BeCompliant!" 640 may each be identified as having appropriate administrative domains based on additional entries in the repository 617. Trust realms are established between "Cars Inc." 610 and "DesignOpt Inc.," 620 between "DesignOpt Inc." 620 and "PerfectSpec Ltd.," 630 and between "PerfectSpec Ltd." 630 and "BeCompliant" 640 such that calls to the services provided by these enterprises are authenticated for the duration of the collaboration.

To determine the trust realms between the appropriate administrative domains, a process described by the pseudo code shown in Table 3 may be used. The trust realms are determined automatically using, for example, the abstract specification of the roles and interaction of generic partners included in the CDL description. The information in the CDL description is analyzed and extracted such that the information is used to establish the trust realms. The process for determining the trust realms between appropriate enterprises is based on the identified appropriate administrative domains (e.g., as identified in the repository 617), the capabilities provided by the appropriate administrative domains, and the interactions between the appropriate administrative domains. The process to determine the trust realms may be executed just before the collaboration is executed.

Secure interactions between different administrative domains (e.g., organizations, companies, and/or enterprises) are implemented through services that issue security tokens at each administrative domain. The services may be Security Token Services (STS). A specification also defines a protocol indicating how to request and/or exchange security tokens. The security tokens indicate that a user has provided sufficient credentials. The services also may convert the security tokens from one format to another (e.g., Kerberos tokens may be converted into X.509 tokens or into Security Assertion Markup Language (SAML) tokens). After an administrative domain receives a security token, the administrative domain attaches authenticated information to a message and sends the message to a partner administrative domain. The partner administrative domain verifies the token, thus allowing authenticated information to be shared. In general, the security token services of an administrative domain build the trust realm, thus allowing the security federation to be configured.

TABLE 3

Trust Realm Determination (Bi-Directional)

1. Determine roles a participant $P_i$ ($1<=i<=n$) is committed to play and store the roles in a list $RO_i$.
2. For elements $R_j$ ($1<=j<=m$) of the type <relationshipType> in the given CDL that is a direct subelement of the root element <package> do:
   a. Analyze the two subelements <roleType> (each roleType has one typeref attribute):
   b. For all participants $P_i$ do:
      If a value "V" of one typeref attribute is $\in RO_i$ store a value "W" of the other attribute in a list $IP_i$ of interacting partners from $P_i$.
3. For all participants $P_i$, map the roleNames of the participants in the list $IP_i$ to the names of actual enterprises.
4. For all participants $P_i$, eliminate duplicates in $IP_i$. Because participants can play multiple roles. Thus, for each partner $P_i$, $IP_i$ includes all organizations with which $P_i$ is interacting.
5. Enable trust relationships between $P_i$ and the organizations with which $P_i$ interacts.

The example shown in Table 3 assumes a bidirectional trust relationship between interacting enterprises. For example, a bidirectional trust relationship exists between a first enterprise and a second enterprise when the first enterprise is granted access to services offered by the second enterprise and the second enterprise is granted access to services offered by the first enterprise. In other examples, unidirectional trust relationships may be implemented such that, for example, the first enterprise has access to services offered by the second enterprise, but the second enterprise does not have access to services offered by the first enterprise. The pseudo code shown in Table 4 may be used to determine a unidirectional trust relationship.

Figure 7A:
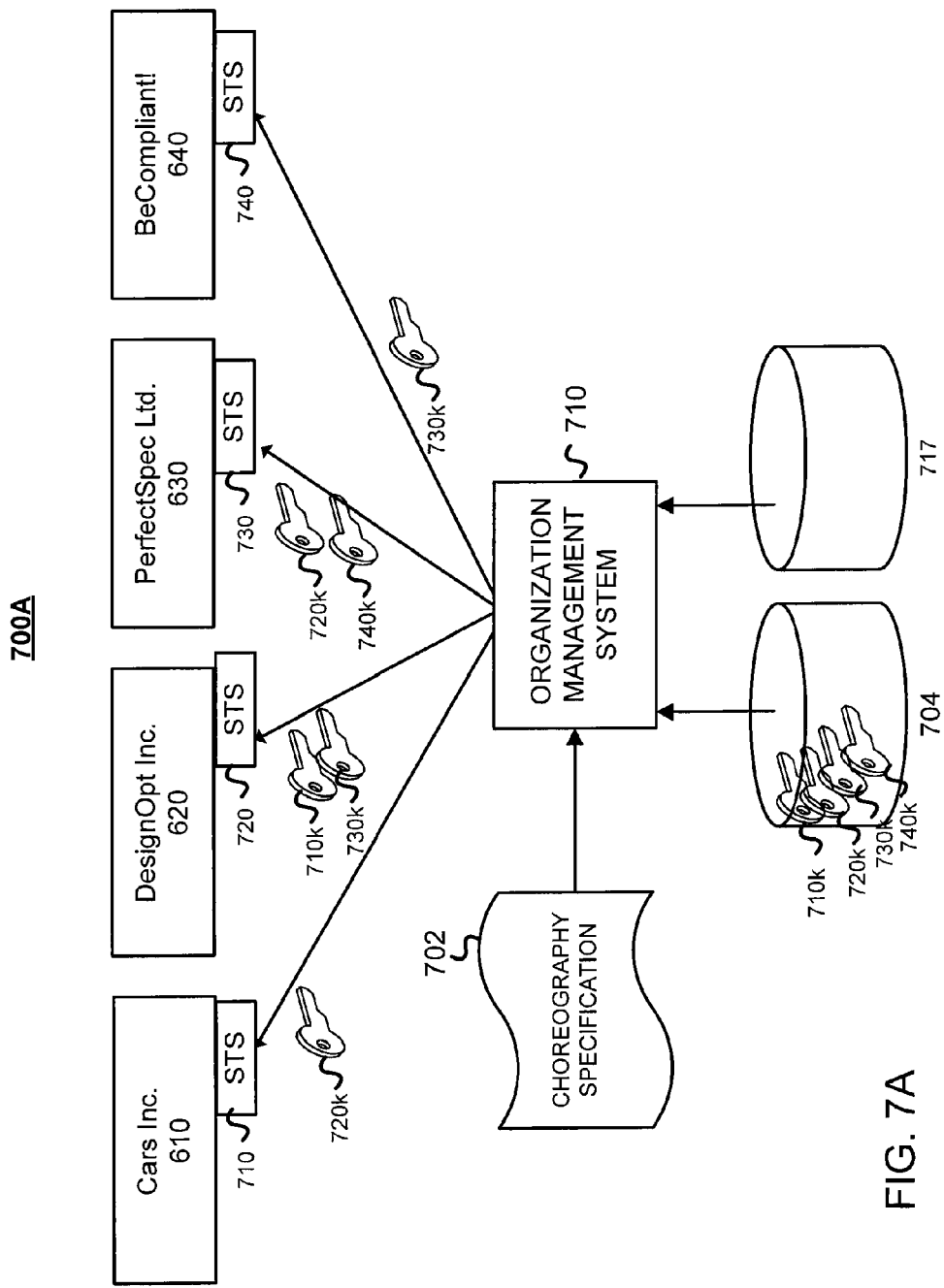

Referring to FIG. 7A, a "Push" architecture 700A is shown. The architecture 700A includes the administrative domains 610, 620, 630, and 640, an organization management system 710, a repository 717, a choreography description 702, and a trust repository 704. The organization management system 710 and the repository 717 may be similar to, respectively, the organization management system 210 and the repository 217 discussed above with respect to FIG. 2. Each of the administrative domains selected as appropriate administrative domains may include security token services

TABLE 4

Trust Realm Determination (Unidirectional)

1. Determine all roles a participant $P_i$ ($1<=i<=n$) is committed to play and store the roles in a list $RO_i$.
2. For each element $R_j$ ($1<=j<=m$) of the type <relationshipType> in the given CDL that is a direct subelement of the root element <package> do:
   a. Analyze the two subelements <roleType> (each roleType has one typeref attribute):
   b. For all participants $P_i$ do:
   If the value V of one typeref attribute is $\in RO_i$ store the value W of the other attribute in the list $IP_i$ of interacting partners ONLY if there is a match from V and W with the two attributes <ToRoleTypeRef>, <FromRoleTypeRef> in the subelement <participate> of an the corresponding <interaction> element in the <choreography> section of the CDL.
3. For all participants $P_i$, map the roleNames of the participants in the list $IP_i$ to the names of actual enterprises.
4. For all participants $P_i$, eliminate duplicates in $IP_i$. Because participants can play multiple roles. Thus, for each partner $P_i$, $IP_i$ includes all organizations with which $P_i$ is interacting.
5. Enable trust relationships between Pi and the organizations with which Pi interacts.

Figure 7B:
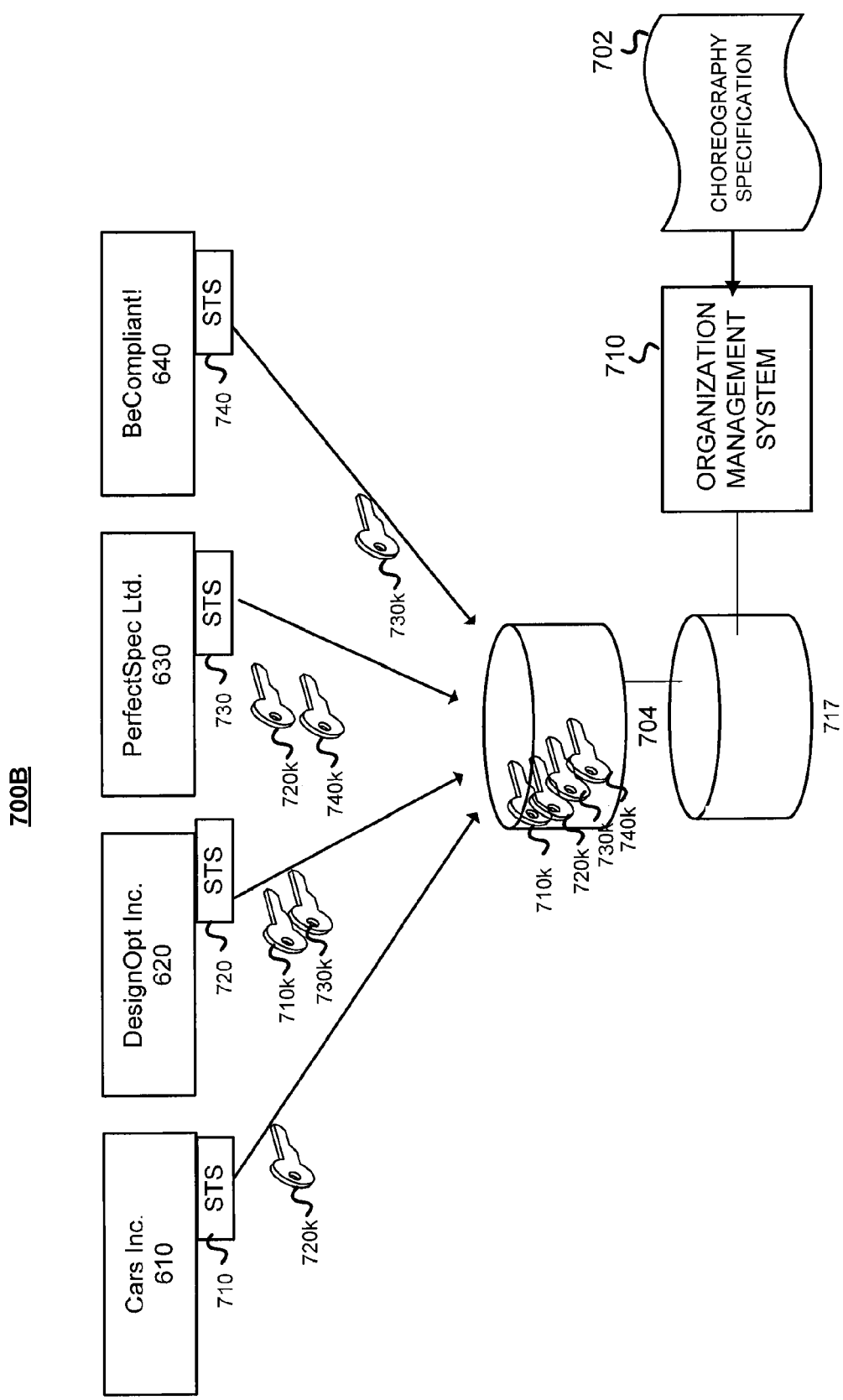
Figure 7C:
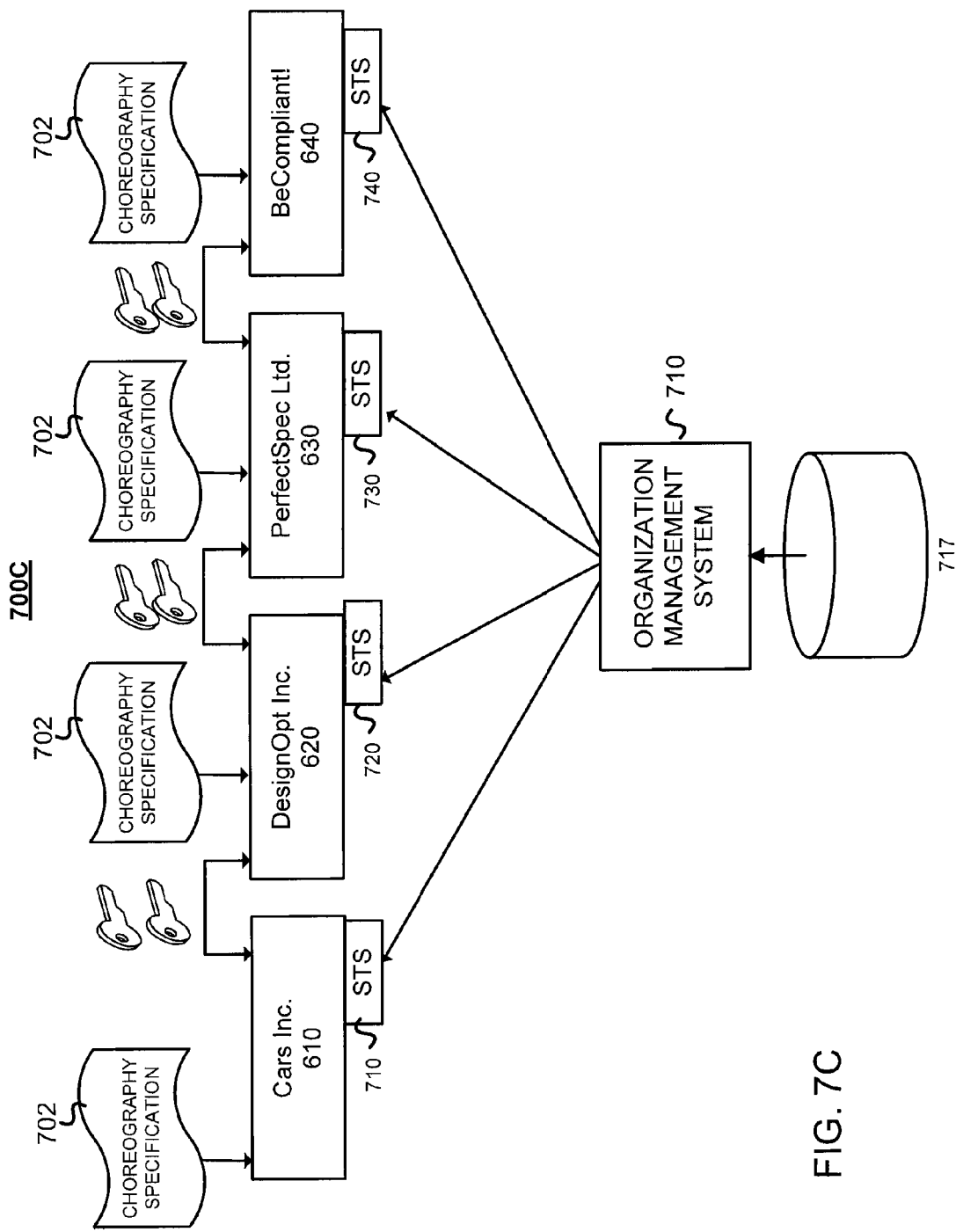

Referring to FIGS. 7A-7C, architectures for distributing the determined trust relationship information. In the examples shown in FIGS. 7A-7C, the appropriate administrative domains have been resolved as discussed above. similar to those described above. The example architecture 700A shown in FIG. 7A includes the appropriate administrative domains selected in a discovery process such as the one described with respect to FIG. 6. Continuing the example above, the appropriate administrative domains are the enterprise 610 ("Cars Inc."), the enterprise 620 ("DesignOpt Inc."), the enterprise 630 ("PerfectSpec Ltd."), and the enterprise 640 ("BeCompliant!"). Each of these enterprises is associated with an administrative domain and an security token service (STS). In particular, the enterprises 610, 620, 630, and 640 are respectively associated with the STSs 710, 720, 730, and 740.

In the architecture 700A, openly accessible trust information (e.g., public keys) that may be used to determine the authenticity of security tokens provided to a first administrative domain are distributed to those administrative domains that interact with the first administrative domain as indicated in the choreography description 702. In the example shown, the choreography description 702 is similar to the example shown in Table 1, and the choreography description 702 formally defines the interactions shown in FIG. 5. The trust information is stored in a trust repository 704. The trust repository 704 may be logically connected to the repository 717, and the trust repository includes trust information for each enterprise for which there is a entry in the repository 717. In the example show, the administrative domains 610, 620, 630, and 640 are respectively associated with trust information 710k, 720k, 730k, and 740k.

The organization management system 710 retrieves the trust information from the trust repository 704 and distributes the trust information to the administrative domains 610, 620, 630, and 640 after signaling to the administrative domains 610, 620, 630, and 640 that the collaboration is about to begin. In some implementations, the trust information is retrieved from the trust repository 704 and distributed by the organization management system 710 concurrently with signaling that the collaboration is about to begin. In the example shown, because the choreography design 702 indicates that the administrative domain "Cars Inc." and the administrative domain "DesignOpt Inc." 620 interact, the organization management system 710 pushes the trust information 720k to the administrative domain "Cars Inc." 610 and the trust information 710k to the administrative domain "DesignOpt Inc." Because the administrative domain "Cars Inc." 610 and the administrative domain "DesignOpt Inc." 620 have the trust information of the other, a trust relationship exists between "Cars Inc." 610 and the administrative domain "DesignOpt Inc" such that secure interaction can occur between the administrative domain 610 and the administrative domain 620.

Similarly, the organization management system 710 pushes the trust information to the other administrative domains such that the administrative domains may interact as indicated by the choreography description 702. As shown, the organization management system 710 pushes the trust information 710k and 730k to the administrative domains associated with "DesignOpt Inc." 620, which establishes a trust relationship between "Cars Inc." 610 and "DesignOpt Inc." 620 as well as a trust relationship between "DesignOpt Inc." 620 and "PerfectSpec Ltd" 630.

Referring to FIG. 7B, an example of a "Pull" architecture 700B is shown. In this example, each of the appropriate administrative domains associated with the enterprises 610, 620, 630, and 640 is signaled at the beginning of a collaboration and downloads the trust information. The illustration shown in FIG. 7B shows the distribution of trust information to implement the interactions described by the choreography description 702. In this example, the interactions described by the choreography description 702 implement the collaboration shown in FIG. 5. In some implementations, the appropriate administrative domains 610, 620, 630, and 640 download the trust information from the trust repository 704. In some implementations, the trust repository may be implemented with the repository 702, and the trust information may be downloaded from the repository 702.

Referring to FIG. 7C, an example of a decentralized distribution architecture 700C is shown. Similar to the examples described with respect to FIGS. 7A and 7B, the architecture 700C distributes trust information to the appropriate administrative domains 610, 620, 630, and 640 to establish trust relationships consistent with the interactions described in the choreography specification 702. In the example shown in FIG. 7C, the administrative domains 610, 620, 630, and 640 contact each other directly to obtain trust information. In this implementation, the choreography specification 702 is received by each of the administrative domains 610, 620, 630, and 640 and the administrative domains 610, 620, 630, and 640 contact each other based upon the interactions defined in the choreography specification 702. In the example shown in FIG. 7C, the choreography specification 702 defines interactions as shown in the collaboration of FIG. 5.

In the example architectures 700A, 700B, and 700C, once the trust information is distributed, the trust realms are established, thus effecting secure interactions between the administrative domains and allowing the collaboration defined in the choreography specification 702 to begin. Administrative domains within a trust realm may exchange messages, which are authenticated with the security tokens provided by the STSs of each of the administrative domains in the trust realm.

Figure 8:
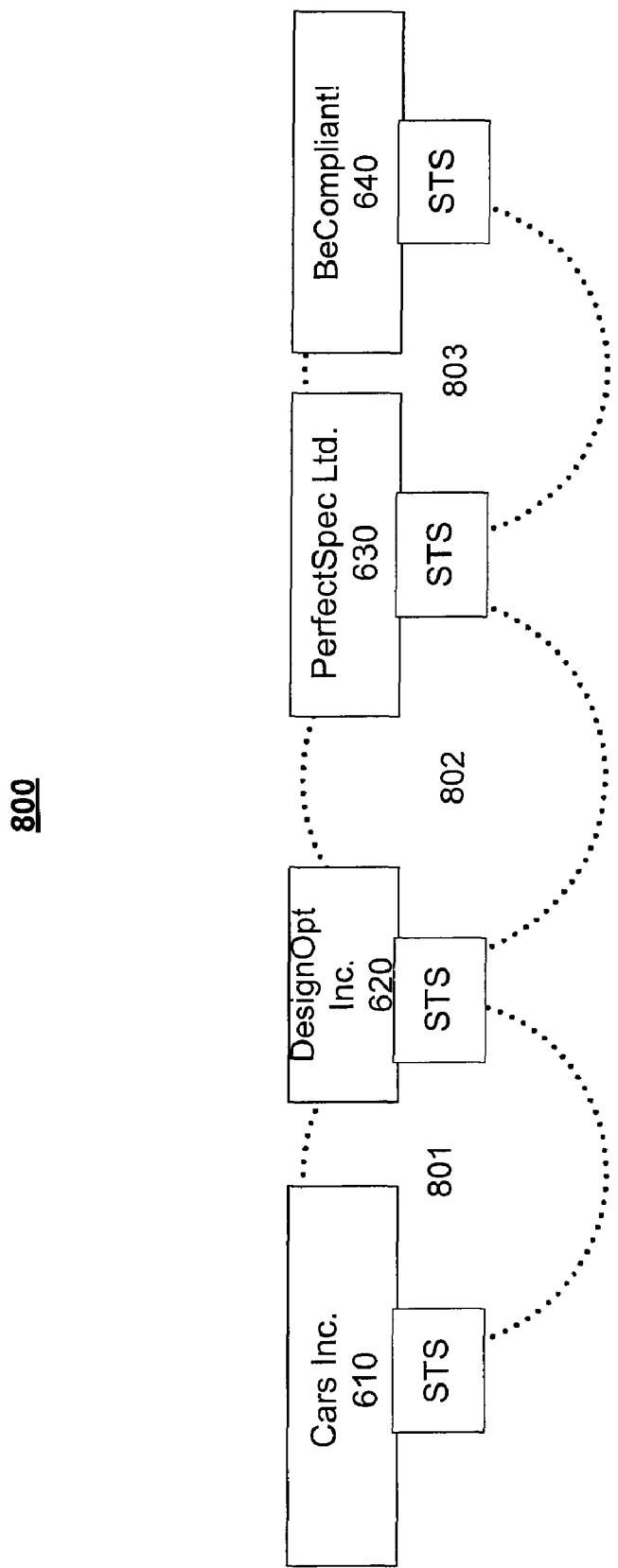
FIGS. 8 and 9 show example architectures for systems for effecting secured interactions.

Referring to FIG. 8, an example scenario 800 for effecting secured interactions between appropriate administrative domains is shown. The scenario 800 illustrates the trust realms 801, 802, and 803 derived and established for the appropriate enterprises 610, 620, 630, and 640 through distributing trust information as discussed with respect to FIGS. 7A-7C. The trust realm 801 allows secure interactions between the enterprise "Cars Inc." 610 and the enterprise "DesignOpt Inc." 620, the trust realm 802 allows secure interactions between the enterprise "DesignOpt Inc." 620 and the enterprise "PerfectSpec Ltd." 630, and the trust realm 803 allows secure interactions between the enterprise "PerfectSpec Ltd." 630 and the enterprise "BeCompliant!" 640. The trust realms 801, 802, and 803 establish peer-to-peer trust relationships between the enterprises associated with the trust realms. In other implementations, a global trust realm may be established such that each of the enterprises 610, 620, 630, and 640 may interact with all of the other enterprises.

Referring to FIG. 9, an example composite services scenario 900 is shown. In the example scenario 900, the interactions between the partners, or enterprises, are aggregated hierarchical interactions rather than peer-to-peer interactions as shown in the example collaboration of FIG. 5. In this example, a hierarchical relationship of interactions between providers of components used in a manufacturing collaboration is shown. The scenario 900 includes trust realms 901, 902, 903, 904, 905, and 906, which allow interactions between a main component provider 910, and sub-providers of components 915, 920, 925, 930, 935, 940, and 945. In the scenario shown, the trust realms 901-906 were derived from a choreography description that defines roles and interactions between enterprises similar to those described above. In this example, the main component provider 910 includes subcomponents from sub-providers 915, 920, 925, and 930, and the sub-provider 915 also includes subcomponents from the sub-provider 935. The basic interactions between the providers is modeled in a CDL and the model is used to derive the trust relationships between the providers (in this example, six trust realms are derived, the trust realms 901, 902, 903, 904, 905, and 906). Because of the hierarchical nature of the interactions in the scenario 900, the sub-provider 915 also includes components from the sub-provider 935 to the main provider 910. The sub-provider 915 obtains the components through the trust realm 905, and the sub-provider 915 provides the components to the main provider 910 through the trust realm 901.

Figure 10:
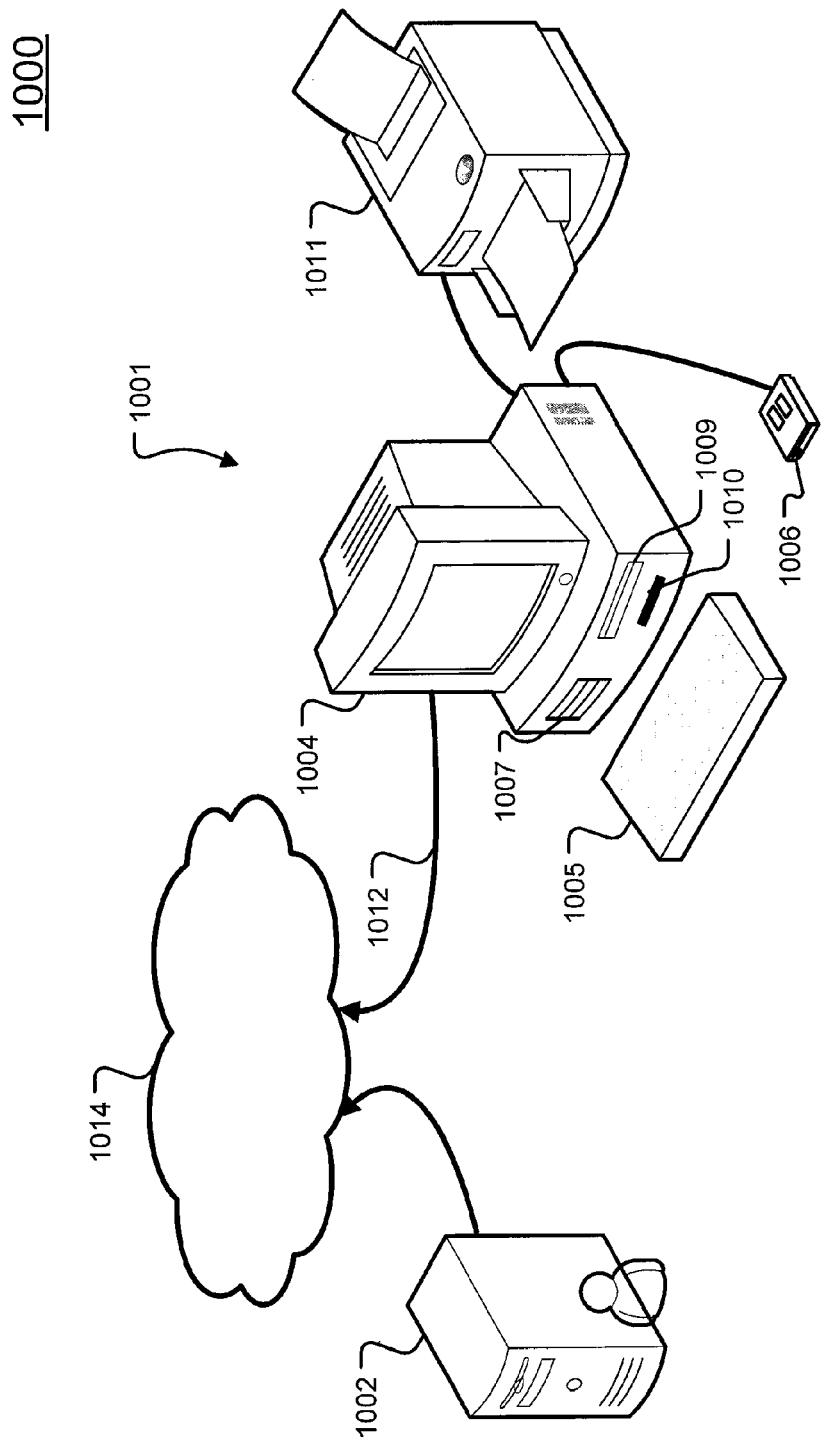
FIG. 10 illustrates the exterior appearance of an example system.

FIG. 10 illustrates the exterior appearance of an exemplary system 1000 that implements the organization management system, according to another general implementation. Briefly, the system 1000 includes a device 1001 that implements an organization management system, and a server 1002. As is described in more detail, below, the device 1001 includes a processor, an interface, and an output module.

In more detail, the hardware environment of the device 1001 includes a display monitor 1004 for displaying text and images to a user, a keyboard 1005 for entering text data and user commands into the device 1001, a mouse 1006 for pointing, selecting and adjusting objects displayed on the display monitor 1004, a fixed disk drive 1007, a removable disk drive 1009, a tape drive 1010, a hardcopy output device 1011, and a computer network connection 1012.

The display monitor 1004 displays graphics, images, and text that comprise the display for the software applications used by the device 1001, as well as the operating system programs necessary to operate the device 1001. A user uses the keyboard 1005 to enter commands and data to operate and control the computer operating system programs, the web browser, and/or the organization management system. The user uses the mouse 1006 to select and adjust graphics and text objects displayed on the display monitor 1004 as part of the interaction with and control of the device 1001 and applications running on the device 1001. The mouse 1006 is any type of pointing device, and may be a joystick, a trackball, a touch-pad, or other pointing device.

In a further implementation, the fixed disk drive 1007 itself may include a number of physical drive units, such as a redundant array of independent disks ("RAID"), or may be a disk drive farm or a disk array that is physically located in a separate computing unit. Such computer readable memory media allow the device 1001 to access computer-executable process steps, application programs and the like, stored on removable and non-removable memory media.

The wireless or wireline computer network connection 1012 may be a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network 1014 may be one or more of a LAN network, a corporate or government WAN network, the Internet, or other network.

The computer network connection 1012 uses a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, a near field communications ("NFC") connector, an orthogonal frequency division multiplexing ("OFDM") ultra wide band ("UWB") wireless connector, a time-modulated ultra wide band ("TM-UWB") wireless connector, or other wireless connector. Example wireline connectors include, for example, a IEEE®-1394 FIREWIRE® connector, a Universal Serial Bus ("USB") connector, a serial port connector, a parallel port connector, or other wireline connector.

The removable disk drive 1009 is a removable storage device that is used to off-load data from the device 1001 or upload data onto the device 1001. The removable disk drive 1009 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, an external hard disk drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the fixed disk drive 1007 or on removable media for the removable disk drive 1009.

The tape drive 1010 is a tape storage device that is used to off-load data from the device 1001 or to upload data onto the device 1001. The tape drive 1010 may be a quarter-inch cartridge ("QIC"), 4 mm digital audio tape ("DAT"), 8 mm digital linear tape ("DLT") drive, or other type of tape.

The hardcopy output device 1011 provides an output function for the operating system programs and applications. The hardcopy output device 1011 may be a printer or any output device that produces tangible output objects, including textual or image data or graphical representations of textual or image data. While the hardcopy output device 1011 is depicted as being directly connected to the device 1001, it need not be. For instance, the hardcopy output device 1011 may be connected to device 1001 via a network interface, such as a wireline or wireless network.

Furthermore, although the device 1001 is illustrated in FIG. 10 as a desktop PC, in further implementations the device 1001 may be a laptop, a workstation, a midrange computer, a mainframe, an embedded system, telephone, a handheld or tablet computer, a PDA, or other type of device that includes a data processing apparatus.

Figure 11:
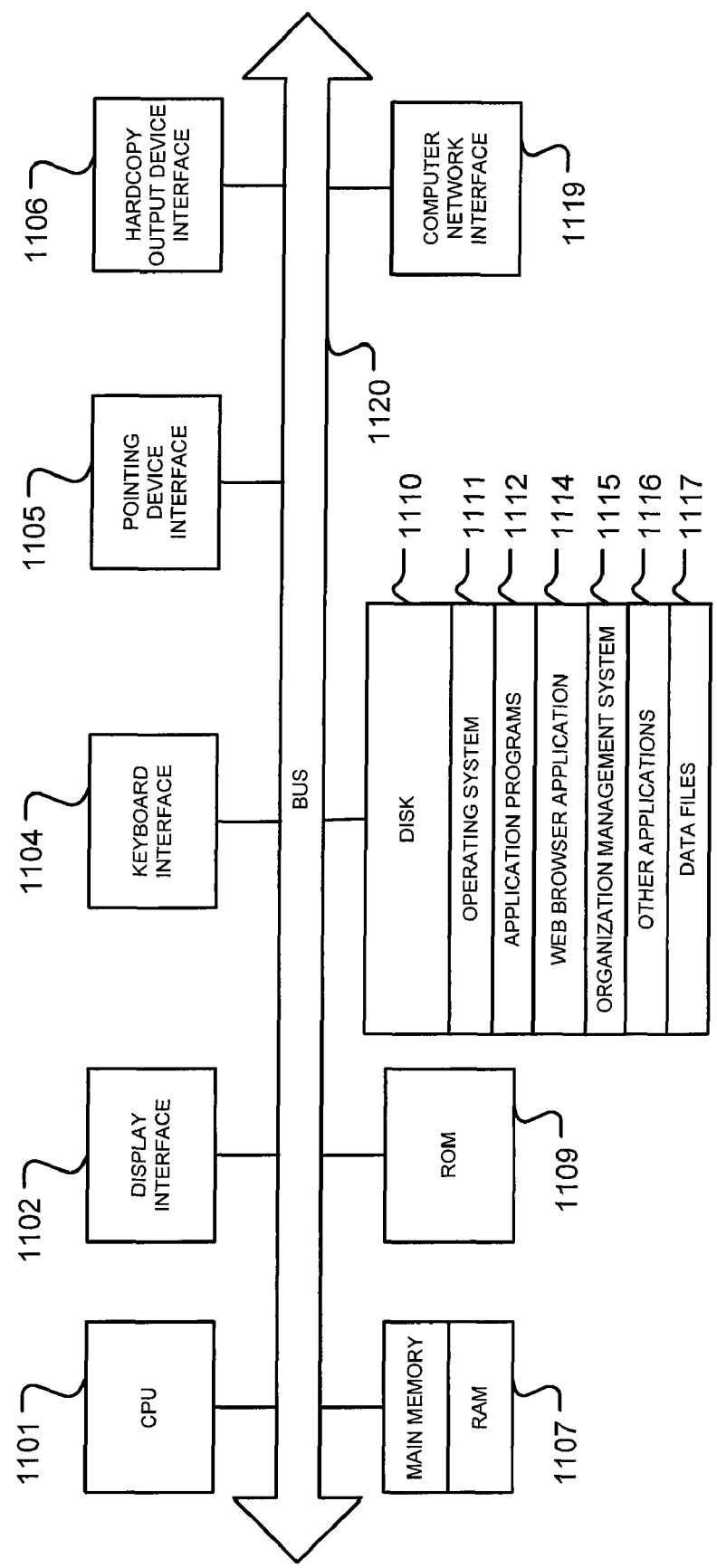
FIG. 11 is a block diagram illustrating the internal architecture of the system shown in FIG. 10.

FIG. 11 is a block diagram illustrating the internal architecture of one computer shown in FIG. 10. The computing environment includes a computer central processing unit ("CPU") 1101 where the computer instructions that comprise an operating system or an application are processed; a display interface 1102 which provides a communication interface and processing functions for rendering graphics, images, and texts on the display monitor 1004; a keyboard interface 1104 which provides a communication interface to the keyboard 1005; a pointing device interface 1105 which provides a communication interface to the mouse 1006 or an equivalent pointing device; a hardcopy output device interface 1106 which provides a communication interface to the hardcopy output device 1011; a random access memory ("RAM") 1107 where computer instructions and data are stored in a volatile memory device for processing by the computer CPU 1101; a read-only memory ("ROM") 1109 where invariant low-level systems code or data for basic system functions such as basic input and output ("I/O"), startup, or reception of keystrokes from the keyboard 1005 are stored in a non-volatile memory device; a storage medium 1110 or other suitable type of memory (e.g. such as random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives), where the files that comprise an operating system 1111, application programs 1112 (including web browser application 1114, an organization management system application 1115, and other applications 1116 as necessary) and data files 1117 are stored; and a computer network interface 1119 which provides a communication interface to the network 1014 over the computer network connection 1012. The constituent devices and the computer CPU 1101 communicate with each other over the computer bus 1120.

The RAM 1107 interfaces with the computer bus 1120 so as to provide quick RAM storage to the computer CPU 1101 during the execution of software programs such as the operating system application programs, and device drivers. More specifically, the computer CPU 1101 loads computer-executable process steps from the fixed disk drive 1007 or other media into a field of the RAM 1107 in order to execute software programs. Data is stored in the RAM 1107, where the data is accessed by the computer CPU 1101 during execution.

Also shown in FIG. 11, the device 1001 stores computer-executable code for a operating system 11111, and application programs 1112 such as word processing, spreadsheet, presentation, gaming, web browsing, JavaScript engine, or other applications.

The computer CPU 1101 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the computer CPU 1101 is more than one processing unit, including a multiple CPU configuration found in high-performance workstations and servers, or a multiple scalable processing unit found in mainframes.

The operating system 1111 may be APPLE® MAC OS X® for INTEL® and POWERPC® based workstations and servers; MICROSOFT® WINDOWS NT®/WINDOWS® 2000/WINDOWS® XP Workstation; MICROSOFT® WINDOWS VISTA®/WINDOWS NT®/WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI workstations and servers, VAX/VMS for Digital Equipment Corporation computers, OPENVMS® for HP ALPHASERVER®-based computers; SYMBIAN OS®, NEWTON®, IPOD®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system 1111 may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT®.NET Compact.

While FIGS. 10 and 11 illustrate one possible implementation of a computing system that executes program code, or program or process steps, configured to implement an organization management system, other types of computers may also be used as well.

Although the term "user" has been consistently used to describe an entity that interacts with these processes, such a generalization is also intended to describe multiple related or unrelated, living or automated entities or beings that interact with these processes at various different, overlapping or non-overlapping states.

Similarly, the term "selection" is intended to denote throughout a manual selection by a human, an automatic selection by a non-human, or some combination thereof. Finally, it is noted that, for the sake of brevity, the terms "Java" and "JavaScript" are intended to reference the SUN MICROSYSTEMS® JAVASCRIPT® programming language, and the term "XML" is intended to reference 'eXtensible Markup Language' throughout.

A number of implementations have been described. Nevertheless, it will be understood that various modifications may be made without departing from the scope of the disclosure. Accordingly, other implementations are within the scope of the following claims.

What is claimed is:

1. A computer-implemented method of deriving a trust realm, the method comprising:
modeling, on a computing device having one or more processors and coupled to a server over a network, a process that involves one or more secure interactions among administrative domains to provide a process model, each of the administrative domains being associated with a generic entity and coupled to the server, the process model specifying generic role information associated with each of the administrative domains and interactions among the administrative domains, the generic role information defining an observable behavior;
receiving, from a repository included within the server over the network, candidate role information associated with candidate administrative domains of candidate entities;
dynamically resolving, using the one or more processors, appropriate administrative domains from the candidate administrative domains based on the process model and the candidate role information;
automatically deriving, using the one or more processors, one or more trust realms among the appropriate administrative domains based on the generic role information and the interactions specified by the process model; and
effecting, over the network, the one or more secure interactions among the appropriate administrative domains through the one or more trust realms.

2. The method of claim 1, wherein the one or more secure interactions further comprise an issuance of security tokens at each of the administrative domains and a format conversion of the security tokens.

3. The method of claim 1, wherein modeling the process further comprises defining an order, a message format, and parameters of the one or more secure interactions.

4. The method of claim 1, further comprising:
determining that a collaboration between any two of the appropriate administrative domains has ended; and
terminating a respective trust realm between the two appropriate administrative domains based on the determining that the collaboration has ended.

5. The method of claim 1, wherein dynamically resolving the appropriate administrative domains further comprises:
generating a list of the candidate administrative domains that satisfy the generic role information specified by the process model; and
selecting the appropriate administrative domains from the list of the candidate administrative domains.

6. The method of claim 5, further comprising transmitting an invitation to each of the candidate administrative domains on the list of the candidate administrative domains, wherein the appropriate administrative domains are selected based on receiving an acceptance to the invitation.

7. The method of claim 6, wherein effecting the one or more secure interactions among the appropriate administrative domains further comprises:
   accessing trust information associated with the appropriate administrative domains;
   signaling, to the appropriate administrative domains, the initiation of one or more collaborations represented by the process model;
   sending the trust information to the appropriate administrative domains such that the one or more secure interactions among the appropriate administrative domains are effected.

8. The method of claim 1, wherein effecting the one or more secure interactions among the appropriate administrative domains further comprises:
   signaling, to the appropriate administrative domains, the initiation of one or more collaborations represented by the process model;
   allowing access to the trust information associated with the appropriate administrative domains such that the trust information is downloadable by other appropriate administrative domains.

9. The method of claim 8, wherein allowing access to the trust information comprises the one or more secure interactions among the appropriate administrative domains such that the appropriate administrative domains exchange the trust information with each other.

10. The method of claim 7, wherein the trust information comprises keys and a name associated with each of the appropriate administrative domains.

11. The method of claim 1, wherein the observable behavior is exhibited by a first administrative domain in order to collaborate with a second administrative domain.

12. The method of claim 11, wherein the generic role information specified by the process model designates the first administrative domain as a buyer role and the second administrative domain as a seller role.

13. The method of claim 11, wherein the generic role information specified by the process model identifies a first behavior that must be satisfied by the first administrative domain and a second behavior that must be satisfied by the second administrative domain.

14. The method of claim 13, wherein one or both of the first behavior and the second behavior comprise a purchasing behavior or a customer management behavior.

15. The method of claim 1, further comprising invoking the process using the appropriate administrative domains.

16. The method of claim 1, wherein the process is a composite services process among hierarchically organized administrative domains.

17. The method of claim 1, wherein:
   the process is a collaborative engineering process, and
   the one or more secure interactions among the administrative domains are peer-to-peer interactions.

18. The method of claim 1, wherein dynamically resolving appropriate administrative domains and automatically deriving one or more trust realms are performed in response to determining that the process is to be executed.

19. A computer-readable storage medium coupled to one or more processing devices and having instructions stored thereon which, when executed by the one or more processing devices, cause the one or more processing devices to perform operations comprising:
   modeling a process that involves one or more secure interactions among administrative domains to provide a process model, each of the administrative domains being associated with a generic entity, the process model specifying generic role information associated with each of the administrative domains and interactions among the administrative domains, the generic role information defining an observable behavior;
   receiving candidate role information associated with candidate administrative domains of candidate entities;
   dynamically resolving appropriate administrative domains from the candidate administrative domains based on the process model and the candidate role information;
   automatically deriving trust realms among the appropriate administrative domains based on the generic role information and the interactions specified by the process model; and
   effecting one or more secure interactions among the appropriate administrative domains through the one or more trust realms.

20. A device comprising:
   a processor configured to:
      model a process that involves one or more secure interactions among administrative domains to provide a process model, each of the administrative domains being associated with a generic entity, the process model specifying generic role information associated with each of the administrative domains and interactions among the administrative domains, the generic role information defining an observable behavior,
      receive candidate role information associated with candidate administrative domains of candidate entities,
      dynamically resolve appropriate administrative domains from the candidate administrative domains based on the process model and the candidate role information,
      automatically derive trust realms among the appropriate administrative domains based on the generic role information and the interactions specified by the process model, and
      effect one or more secure interactions among the appropriate administrative domains through the one or more trust realms; and
   a repository configured to:
      store the candidate role information associated with each of the candidate administrative domains and relationship types associated with each of the candidate administrative domains, and
      transmit the candidate role information and the relationship types to the processor.

* * * * *